United States Patent [19]

Schwarz

[11] Patent Number: 4,469,749

[45] Date of Patent: Sep. 4, 1984

[54] METALIZED RECORDING PAPERS, AND A PROCESS FOR THEIR MANUFACTURE

[75] Inventor: Günther Schwarz, Münster, Fed. Rep. of Germany

[73] Assignee: BASF Farben & Fasern AG, Hamburg, Fed. Rep. of Germany

[21] Appl. No.: 432,946

[22] PCT Filed: Mar. 24, 1982

[86] PCT No.: PCT/DE82/00068

§ 371 Date: Sep. 27, 1982

§ 102(e) Date: Sep. 27, 1982

[30] Foreign Application Priority Data

Mar. 31, 1981 [DE] Fed. Rep. of Germany ....... 3112658

[51] Int. Cl.[3] ........................ B32B 5/16; B32B 19/04; B41M 5/00

[52] U.S. Cl. ................................ 428/403; 346/135.1; 427/146; 427/201; 427/202; 427/214; 427/294; 427/391; 427/395; 428/206; 428/207; 428/208; 428/209; 428/211; 428/323; 428/331; 428/404; 428/486; 428/488.1

[58] Field of Search .............. 101/DIG. 2; 346/135.1; 427/146, 180, 189-191, 201, 202, 212, 214, 294, 391, 395; 428/207-211, 323, 331, 403, 404, 486, 487, 537, 913, 206, 464, 467, 488

[56] References Cited

U.S. PATENT DOCUMENTS 3,786,518 1/1974 Atherton ........................ 346/135.1

*Primary Examiner*—Bruce H. Hess
*Attorney, Agent, or Firm*—Wells & Wells

[57] ABSTRACT

Metalized recording papers contain, located on a paper web, a firmly adhering varnish coating in which mineral fillers and/or pigments combined with wax particles are embedded and the external surface of the varnish coating is covered with a metal layer, preferably an aluminum layer obtained by vacuum evaporation.

13 Claims, No Drawings

METALIZED RECORDING PAPERS, AND A PROCESS FOR THEIR MANUFACTURE

BACKGROUND OF THE INVENTION

The invention relates to metalized recording papers based on metalized varnish coatings applied to paper and to a process for their manufacture. These papers are used in recording processes in electronic data processing.

Commercially available papers of this type are coated with a black-pigmented nitrocellulose varnish which contains zinc stearate as a flatting agent. These coatings are prepared from nitrocellulose varnishes containing organic solvents. They contain zinc stearate as a flatting agent, since it has been found that, in these varnishes, mineral fillers cannot be used as flatting agents. On recording papers bearing data, the extremely thin metal layer has been removed at well defined points, and the varnish coating is bared. To evaluate the papers, the latter are brought into contact with highly sensitive metal brushes. When mineral fillers are present in the varnish film, abrasion is so great that the brushes must be frequently replaced. Since zinc stearate does not cause such abrasion, only this flatting agent could be used.

For industrial safety reasons, it was desirable to replace the nitrocellulose varnishes dissolved in organic solvents by varnish systems which are aqueous or dilutable with water.

SUMMARY OF THE INVENTION

This object was achieved by means of a metalized recording paper based on metalized varnish coatings applied to paper, wherein, on paper, a firmly adhering varnish coating in which mineral fillers and/or pigments combined with wax particles are embedded is located and the external surface of the varnish coating is covered with a metal layer.

The varnish coating is preferably located on a continuous paper web.

The mineral filler and/or pigment particles embedded in the varnish coating are preferably covered with a wax coating.

In a particularly preferable embodiment, the varnish coating contains embedded amorphous silica having a refractive index of 1.45–1.47. The varnish coating thus appears transparent and matt. It is particularly advantageous that the amorphous silica particles are covered with a wax coating.

The external surface of the varnish coating is covered with a metal layer obtained by vacuum evaporation and which, as a rule and in the preferable case, is an aluminum layer.

The varnish coating is pigmented pure black and is dull matt. In those areas where the aluminum layer has been removed from the coating the aluminum surface appears white against a pure black background.

It was surprising, and could not be predicted, that the wax content, or rather the filler and/or pigment particles covered with wax, would reduce abrasion to such an extent that wear of the brushes is virtually eliminated.

DESCRIPTION OF THE PREFERRED EMBODIMENTS

The metalized recording papers according to the invention can be manufactured by applying, to paper or paper web, an aqueous varnish which contains mineral fillers and/or pigments, at least some of the filler and/or pigment particles being covered with a wax coating, and, after hardening of the varnish film of the coating, covering the surface of the film in a known way, by vacuum evaporation, with a metal layer. Preferably, the metal layer evaporated-on in vacuo is an aluminum layer.

The aqueous varnish used for the manufacture according to the invention can be a dispersion varnish of the type commercially available. Preferably dispersion varnishes are based on acrylate resin.

However, acid-hardening aqueous varnishes are preferably used. They contain, as film-formers, melamine-formaldehyde condensation products etherified with methanol and plasticized by water-soluble unsaturated or saturated polyester resins.

Acid-hardening aqueous varnishes of this type are also commercially available. They are hardened by adding acid shortly before processing.

However, the fact that acid is added also necessitates that the zinc stearate used as a flatting agent in nitrocellulose varnishes cannot be used in the aqueous varnishes, since zinc stearate is decomposed by acids. When choosing mineral fillers for acid-hardening varnishes, only those fillers can be used which are not attacked by acids. It is for this reason that the preferable flatting agent in aqueous varnishes is amorphous silica. The latter also has the further advantage that it has a refractive index of 1.45–1.47, which corresponds to the refractive index of the film-former, so that the coating appears transparent and is matt to dull matt depending on the amount of flatting agent added.

When ready for processing, the aqueous varnishes contain a solids content of 50–70% by weight. They do not contain organic solvents. The proportion of mineral fillers is between 5 and 10% by weight, relative to the ready-to-use varnish.

Those aqueous varnishes are preferably proposed whose mineral filler and/or pigment particles, or amorphous silica particles, are covered with a wax coating. This coating is obtained by allowing a heated wax emulsion in water at 95°–100° C. to flow into a vigorously stirred aqueous varnish. At least some of the filler particles are thus covered with a wax coating.

The wax preferably used for preparing the hot wax emulsion is a montan wax the melting point of which is preferably above 60° C.

To manufacture the metalized recording papers, papers, as a rule absorbent papers, are used in the form of sections or as continuous webs. The ready-to-use aqueous varnish is applied to the paper. In the case of acid-hardening varnishes, the acid hardener was added to, and mixed with, the varnish before processing. The varnish is applied by the methods known in the surface coatings industry, preferably by roller coating or by knife coating using a doctor blade. The amount to be applied can be varied within wide limits. In one processing method mentioned by way of example, a paper web weighing between 30 and 60 g/m$^2$ is coated in such a way that a film of 3–5 g of solids per m$^2$ is produced. The film is hardened in a customary way. As a rule, elevated temperatures are used. Thus, for example, the surface temperature of the varnish film is between 140° and 180° C. when using hot air exposure, by means of jet drying, over a period of about 10 seconds. This time can be shortened still further if the surface temperature of the object is further increased, for example by using infrared radiation.

When using a black-pigmented aqueous varnish, the varnish film is pure black and dull matt. The pick-off brushes for computer reproduction are not markedly attacked by the film.

After complete hardening of the varnish film, the surface of the varnish film is covered by one of the known vacuum metalization processes with a thin layer of metal. This metal is preferably aluminum.

The metalized recording papers thus manufactured can be used for producing data carriers.

EXAMPLE

An aqueous varnish containing plasticizer or plasticized resin and which is based on methanol-etherified melamine-formaldehyde resin and has a binder solids content of 60% and a dispersed fraction of 1 part of carbon black and 5 parts of amorphous silica having a refractive index of 1.46 and a mean particle size between 2 and 8 $\mu m$, relative to 100 parts of the aqueous varnish, is stirred at 2,000 rpm with the aid of a stirrer. 50 parts of a 10% strength wax emulsion in water, maintained at a temperature of 98° C., are slowly allowed to flow into the resulting stirring cone in the aqueous varnish. Stirring is continued for some time after the flowing-in is complete.

To prepare the wax emulsion, an ester wax based on bleached and modified montan wax was used. The wax had a melting point of 78°-80° C., a Höppler cone flow point at 25° C. of about 100 kg/cm$^2$, a penetrometer number of 3.5 at 25° C./100 g/5 sec., a density at 20° C. of 1.01-1.02, an Ubbelohde melt viscosity at 100° C. of about 27 centistokes and a cloud point in toluene of about 39° C. To prepare the wax emulsion, hot water was initially used, into which the wax flakes were stirred until they had dissolved to form an emulsion. The mixture was then briefly boiled and adjusted to 10% by weight of wax. The temperature of 98° C. was maintained until further processing. The wax-containing aqueous varnish thus prepared is ready to use. Shortly before processing, a hardener solution containing 10 parts of p-toluene-sulfonic acid is admixed.

This black matt varnish is roller-coated onto a continuous paper web with the aid of rolls. The paper used has a weight of about 45 g/m$^2$. The amount roller-coated on is such that, after hardening of the varnish coating, a dry varnish film weighing about 3-5 g/m$^2$ is present. The roller-coated coating is hardened with the aid of jet drying, the varnish film being exposed for 10 seconds to 160°-180° C. The coating obtained is pure black and dull matt.

Aluminum is then evaporated onto the coating with the aid of a vacuum metalization process. The metalized recording paper is then complete and ready to use.

I claim:

1. In a metalized recording paper comprising a paper base, a firmly adhering varnish coating on said paper base containing materials selected from the group consisting of mineral fillers, pigments, and mixtures thereof and a metal layer on said varnish coating, the improvement comprising:

at least some of said materials covered with a wax coating.

2. The metalized recording paper of claim 1, wherein said varnish coating is located on a continuous paper web.

3. The metalized recording paper of claim 1, wherein said materials are covered with a wax coating.

4. In a metalized recording paper comprising a paper base, a firmly adhering varnish coating on said paper base containing amorphous silica and a metal layer on said varnish coating, the improvement comprising:

at least some of said amorphous silica covered with a wax coating.

5. The metalized recording paper of claim 4, wherein said amorphous silica has a refractive index of 1.45 to 1.47.

6. The metalized recording paper of claim 5, wherein said amorphous silica comprise particles covered with a wax coating.

7. The metalized recording paper of claim 6, wherein said metal layer is obtained by vacuum evaporation.

8. The metalized recording paper of claim 7, wherein said metal layer is an aluminum layer.

9. The metalized recording paper of claim 8, wherein said varnish coating contains black pigments and said varnish coating is black and dull matt.

10. In a process for manufacturing a metalized recording paper, comprising:

(a) applying to a paper base an aqueous varnish coating containing materials selected from the group consisting of mineral fillers, pigments, and mixtures thereof;

(b) hardening said varnish coating to a varnish film; and (c) covering said varnish film with a vacuum deposited metal layer;

the improvement comprising covering at least some of said materials with a wax coating prior to step (a).

11. The process of claim 10, wherein said materials are particles having a refractive index of 1.45 to 1.47, and said particles are covered with a wax coating.

12. The process of claim 11, wherein said metal layer is aluminum.

13. The process of claim 12, wherein said pigments are black.

* * * * *